United States Patent Office 2,971,884
Patented Feb. 14, 1961

2,971,884
METHOD FOR THE CONTROL OF FUNGAL ORGANISMS

Richard H. Gruenhagen, Blacksburg, Va., Bruce A. Ashby, Schenectady, N.Y., and Edgar C. Britton and Lee H. Horsley, Midland, Mich., assignors to The Dow Chemical Company, Midland, Mich., a corporation of Delaware No Drawing. Filed Mar. 12, 1959, Ser. No. 798,801

8 Claims. (Cl. 167—33)

This invention is concerned with fungicides and is more particularly directed to new compositions and methods for the control of fungus organisms.

It is an object of the present invention to provide a new method for the control of many common fungi. A further object of the present invention is the provision of an improved method wherein novel compositions are employed for fungus control. An additional object is to provide a composition which is adapted to be applied to the aerial portions of plants for the control of plant fungi without substantial injury to the plant foilage. Additional objects will become apparent to those skilled in the art from the following specification and claims.

In accordance with the present invention, it has been discovered many fungus organisms can be controlled by applying a dithiocarbamic acid inner salt in a fungicidal carrier to the fungal organism and/or its habitat. The dithiocarbamic acids which are within the scope of the present invention are particularly the dithiocarbamic acids having the formula

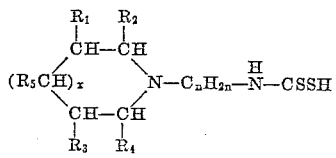

wherein, in this and succeeding formulae, $n$ represents an integer from 2 to 4, inclusive, $R_1$ and $R_2$ each represent hydrogen, lower alkyl or ethylene radicals joined together to form with the carbon atoms of attachment of the heterocyclic ring a six-membered saturated ring, $R_3$, $R_4$ and $R_5$ each represent hydrogen or lower alkyl; and, $x$ represents an integer from 0 to 1, inclusive. These acids are effective fungicides and are adapted to be employed in combination with a fungicidal carrier for the control of a wide range of fungi. The dithiocarbamic acid compounds are substantially insoluble in most organic solvents and only slightly soluble in water. They are adapted readily and conveniently to be employed for the control of many fungal organisms and particularly those organisms ordinarily found on the aerial portions of plants. The compounds may also be applied in dormant applications to the woody surfaces of plants or to orchard floor surfaces for the control of the overwintering spores of many fungi. It is an advantage of the present invention that compositons containing these compounds may be applied to growing vegetation in amounts required for effective control of the fungi without significant injury to the plants. It is a further advantage that a single application of the compounds will provide a residual and extended control of fungi over a period of several months.

In carrying out the method of the present invention the undesirable fungal organisms may be controlled by contacting the organisms and/or their habitats with a parasiticidal amount of one of the dithiocarbamic acid compounds. However, the present invention also embraces the employment of the compounds in combination with parasiticidal carriers such as liquid, powder or dust composition. Such compositions are adapted to be applied to the fungal organism or its habitat such as living plants without substantial injury to the plants. In preparing toxicant compositions, the dithiocarbamic acid compounds may be modified with one or more of a plurality of additaments or fungicidal carriers including organic solvents, petroleum distillates, water, and other liquid carriers, surface active dispersing agents and finely divided inert solids. Depending upon the concentration in the composition of the dithiocarbamic acid product, such augmented compositions are adapted to be employed for the control of the undesirable fungi or employed as concentrates and subsequently diluted with additional inert carrier to produce the ultimate treating compositions. In compositions to be employed as concentrates, the dithiocarbamic acid toxicants oftentimes are present in a concentration from about 5 to 95 percent by weight.

The exact concentration of the dithiocarbamic acid employed in the compositions for application to the fungus organisms and/or their habitats may vary provided a a fungicidal or fungistatic dosage of toxicant is supplied either on the organism or its environment. This dosage of toxicant is primarily dependent upon the susceptibility of the particular organism to the toxicant. In general, good results are obtained with liquid carrier compositions containing from about 0.001 to 2.0 percent by weight of toxicant, although compositions containing as much as 50 percent by weight may be applied to orchard floor surfaces for the control of spores. With dusts, good results are obtained with carrier compositions containing from 0.01 to 5.0 percent or more by weight of toxicant. Where the compositions are to be applied to living plants, it is preferred that the toxicant be present in an amount not to exceed about 0.8 percent in liquid carrier compositions and 1.0 percent in dusts.

In the preparation of dust compositions, the toxicant product may be compounded with any of the finely divided solids carriers, such as for example, pyrophyllite, talc, chalk, gypsum and the like. In such operations, the finely divided carrier is ground or mixed with the toxicant or wet with an aqueous solution of the toxicant. Similarily, dust compositions containing the product may be compounded with various solid surface active carriers or dispersing agents, such as fuller's earth, bentonite, attapulgite, and other clays. Depending upon the proportions of ingredients these dust compositions may be employed as concentrates and subsequently diluted with additional carriers such as solid surface active dispersing agents or with pyrophyllite, chalk, talc, gypsum and the like to obtain the desired amount of active ingredient in a composition adapted to be employed for the control of fungi. Also, such concentrate dust compositions may be dispersed in water, with or without the aid of dispersing agents to form spray mixtures.

Further, the toxicant compounds or a liquid or dust concentrate composition containing such compounds may be incorporated in intimate mixture with carriers such as the surface-active dispersing agents, as for example, the ionic and non-ionic emulsifying agents to form spray concentrates. Such concentrates are readily dispersible in liquid carriers to form sprays containing the toxicants in any desired amount. The choice of dispersing agents and the amounts thereof employed are determined by the ability of the agents to facilitate the dispersion of the concentrate in the liquid carrier to produce the desired spray compositions. Preferred dispersing agents which may be employed in these compositions are oil-soluble and include the non-ionic emulsifiers such as the condensation products of alkylene oxides with the inorganic acids, polyoxyethylene derivatives of sorbitan esters, complex ether alcohols and the like. However, oil-soluble ionic emulsifying agents such as mahogany soaps may also be used. The surface active dispersing agents are usually employed in liquid compositions in the amount of from 1 to 20 percent by weight of the combined weight of the dispersing agent and active compound.

When operating in accordance with the present invention, the toxicant compounds or a composition containing the compounds and a carrier may be applied to the fungus organisms to be controlled or to their habitats in any convenient fashion, e.g., by means of hand dusters or sprayers. Applications to the above ground portions of plants conveniently may be carried out with power dusters, boom sprayers and spray dusters. In foliar applications, the employed compositions should not contain any appreciable amount of any phytotoxic diluents. In large scale operations, dusts or low volume sprays may be applied from airplanes.

The toxicant compounds may be prepared by reacting carbon disulfide with a 5- or 6-membered N-heterocyclic compound having the formula

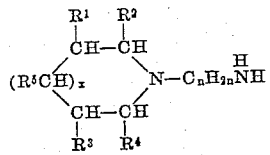

wherein $R'$, $R^2$, $R^3$, $R^4$, $R^5$, $n$ and $x$ have the aforesaid values.

The reaction is somewhat exothermic and proceeds smoothly at temperatures of from 0° C. to about room temperature. The temperature conveniently may be controlled by regulating the rate of contacting the reactants and/or by external cooling. Preferably, the reaction may be carried out in the presence of an inert organic solvent such as benzene. Good results are obtained when employing substantially equimolecular proportions of the reactants.

In a preferred manner of carrying out the preparation of the active ingredients of the present invention, carbon disulfide dissolved in an inert organic solvent such as benzene is slowly added portionwise with stirring and cooling to the amine compound and at a temperature of between 0° C. and room temperature. The order of addition of the reactants is not critical and the amine may be added to the carbon disulfide. During the addition a precipitate forms in the reaction zone. Upon completion of the reaction, the precipitate which forms is separated in conventional manner such as by filtration or decantation.

It is to be understood that the symbols

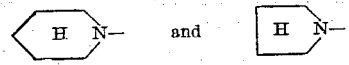

represent saturated ring structures.

The following preparations are illustrative of the preparation of the new toxicant compounds of the present invention but are not to be construed as limiting.

PREPARATION 1

*3-(1-pyrrolidinyl)propyldithiocarbamic acid*

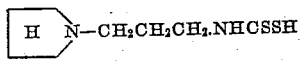

Carbon disulfide (76 grams; 1.0 mole) dissolved in 560 milliliters of benzene was slowly added portionwise with stirring to 128 grams (1.0 mole) of 1-(3-aminopropyl)-pyrrolidine. The addition was carried out with cooling and at a temperature of about 25° C. During the addition a white crystalline solid precipitated in the reaction mixture. Upon completion of the reaction, as evidenced by the substantial cessation of the formation of precipitate, the precipitate was separated by filtration to obtain a 3-(1-pyrrolidinyl)-propyldithiocarbamic acid product in essentially quantitative yield. The product was found to melt at 147°–149° C.

| Analysis | Found | Theory |
| --- | --- | --- |
| C | 48.41 | 47.10 |
| H | 8.04 | 7.82 |
| N | 12.89 | 13.68 |
| S | 31.76 | 31.40 |

PREPARATION 2

*1-methyl-3-(1-pyrrolidinyl)propyldithiocarbamic acid*

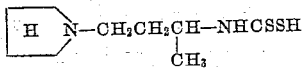

Carbon disulfide (5.92 grams; 0.091 mole) dissolved in 150 milliliters of benzene was slowly added portionwise to 12.9 grams (0.091 mole) of 1-(3-aminobutyl)-pyrrolidine. The addition was carried out with stirring and cooling at a temperature of from 20° to 25° C. During the addition a white crystalline solid precipitated in the reaction mixture. Upon completion of the reaction, the solid was recovered by filtration to obtain 3.60 grams of a 3-(1-pyrrolidinyl)-1-methylpropyldithiocarbamic acid product as a fine white powder having a melting point of 129°–131° C.

PREPARATION 3

*Methyl-2-(1-pyrrolidinyl)ethyldithiocarbamic acid*

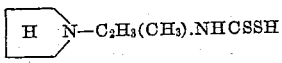

Employing an analogous procedure as set forth in Example 2, 3.98 grams (0.0524 mole) of carbon disulfide dissolved in benzene was slowly added portionwise to 6.7 grams (0.0524 mole) of 1-(2-aminomethylethyl)-pyrrolidine (obtained from the reaction between 1,2-propylenediamine and 1,4-dibromobutane) and there was obtained 8.0 grams (83 percent yield) of a methyl-2-(1-pyrrolidinyl)ethyl dithiocarbamic acid product melting at 135°–138° C.

PREPARATION 4

*2-methyl-3-(1-pyrrolidinyl)propyldithiocarbamic acid*

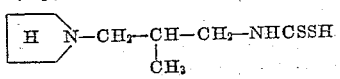

Carbon disulfide (17.1 grams; 0.225 mole) dissolved in 50 milliliters of benzene was slowly added portionwise to 32 grams (0.225 mole) of 1-(2-methyl-3-aminopropyl)pyrrolidine in 150 milliliters of benzene. The addition was carried out with stirring and cooling and at a temperature of from 25–30° C. During the addition a solid precipitated in the reaction mixture. Upon completion of the reaction, the solid was recovered by filtration to obtain a 2-methyl-3-(1-pyrrolidinyl)propyldithiocarbamic acid product having a melting point of 107°–110° C.

PREPARATION 5

*3-piperidinopropyldithiocarbamic acid*

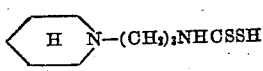

Carbon disulfide (114 grams; 1.5 moles) dissolved in benzene was slowly added portionwise to 213 grams (1.5 moles) of 1-(3-aminopropyl)piperidine. The addition was carried out with stirring and cooling out at a temperature of from 10–25° C. During the addition a white crystalline solid precipitated in the reaction mixture. Upon completion of the reaction, the solid was recovered by filtration to obtain a 3-piperidinepropyldithiocarbamic acid product having a melting point of 138°–140° C. (decomp.).

| Analysis | Found | Theory |
| --- | --- | --- |
| C | 50.85 | 49.6 |
| N | 12.5 | 12.84 |
| H | 8.62 | 8.26 |
| S | 29.41 | 29.30 |

PREPARATION 6

3-(5-ethyl-2-methyl-piperidino)propyldithiocarbamic acid

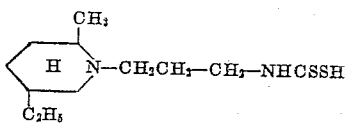

Carbon disulfide (15.2 grams; 0.2 mole) dissolved in 500 grams of benzene was slowly added portionwise to 36.8 grams (0.2 mole) of 1-(3-aminopropyl)-5-ethyl-2-methylpiperidine dissolved in 100 grams of benzene. The addition was carried out with stirring and cooling and at a temperature of from 20° to 25° C. During the addition a white crystalline solid precipitated in the reaction mixture. Upon completion of the reaction, the solid was recovered by filtration to obtain a 3-(5-ethyl-2-methylpiperidino)propyldithiocarbamic acid product which on recrystallization from water was found to have a melting point of 95°–105° C. (decomp.).

PREPARATION 7

3-(decahydro-1-quinolyl)propyldithiocarbamic acid

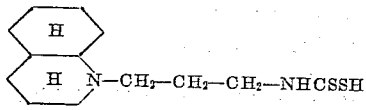

Carbon disulfide (7.76 grams; 0.102 mole) was slowly added portionwise to 20 grams (0.102 mole) of 1-(3-aminopropyl)decahydroquinoline dissolved in 100 milliliters of benzene. The addition was carried out with stirring and cooling and at a temperature of from 20° to 25° C. During the addition a solid precipitated in the reaction mixture. Upon completion of the reaction, the solid was recovered by filtration to obtain 13.0 grams (48.0 percent yield) a 3-(decahydro-1-quinolyl)-propyldithiocarbamic acid product having a melting point of 130°–133° C.

PREPARATION 8

3-(2-butylpyrrolidinyl)propyldithiocarbamic acid

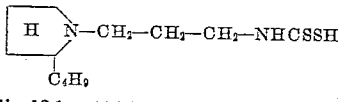

Carbon disulfide (114 grams; 1.5 moles) dissolved in benzene is slowly added portionwise to 276 grams (1.5 moles) of 1-(3-aminopropyl)-2-butylpyrrolidine. The addition is carried out with stirring and cooling and at a temperature of from 20° to 25° C. During the addition a white crystalline solid precipitated in the reaction mixture. Upon completion of the reaction, the solid is recovered by filtration to obtain a 3-(2-butyl-1-pyrrolidinyl)propyldithiocarbamic acid product having a molecular weight of 260.

PREPARATION 9

4-piperidinobutyldithiocarbamic acid

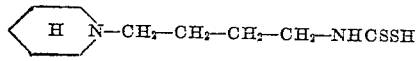

Carbon disulfide (114 grams; 1.5 moles) dissolved in benzene is slowly added portionwise to 234 grams (1.5 moles) of 1-(4-aminobutyl)piperidine. The addition was carried out with stirring and cooling and at a temperature of from 20° to 25° C. During the addition a white crystalline solid precipitates in the reaction mixture. Upon completion of the reaction, the solid is recovered by filtration to obtain a 4-piperidinobutyldithiocarbamic acid product having a molecular weight of 232.

In the manner of the foregoing examples other alkyl dithiocarbamic acids may be prepared as follows:

2 - (1 - pyrrolidinyl) - 1,1 - dimethyl - ethyldithiocarbamic acid employing carbon disulfide and 1-(2-amino-2-methylpropyl)pyrrolidine.

4-(1-pyrrolidinyl)butyldithiocarbamic acid employing carbon disulfide and 1-(4-aminobutyl)pyrrolidine.

The following examples illustrate the present invention but are not to be construed as limiting.

EXAMPLE 1

25 parts by weight of 3-(1-pyrrolidinyl)propyl dithiocarbamic acid (of preparation 1) is mixed and ground with 71 parts of fuller's earth, 2 parts of an alkylaryl sulfonate (Nacconol NR), and 2 parts of a substituted benzoid alkyl sulfonic acid (Daxad No. 27) to prepare a concentrate in the form of a wettable powder. In a similar manner, other concentrate compositions are prepared by employing one of the dithiocarbamic acids such as, 1-methyl-2-(1-pyrrolidinyl)-propyl dithiocarbamic acid, 3-piperidinopropyl dithiocarbamic acid, 3-(decahydro-1-quinolyl)propyl dithiocarbamic acid in place of the 3-(1-pyrrolidinyl)propyl dithiocarbamic acid.

Also, 90 parts by weight of 3-(5-ethyl-2-methylpiperidino)propyl dithiocarbamic acid and 10 parts by weight of a sorbitan monolaurate polyoxyethylene derivative (Tween 20) are mixed together to prepare a water-dispersible concentrate composition. In a similar manner, other water-dispersible concentrates can be prepared by employing one of the dithiocarbamic acids of the above preparations in place of the 3-(5-ethyl-2-methylpiperidino).

The concentrate compositions can be dispersed in water to provide aqueous compositions having very desirable wetting properties. The latter aqueous compositions are adapted to be employed to distribute the dithiocarbamic acid compounds in fungicidal amounts.

EXAMPLE 2

A water dispersible concentrate composition was prepared by mixing and grinding together in a ballmill 0.25 percent by weight of 3-(decahydro-1-quinolyl)propyl-dithiocarbamic acid, prepared in the manner of Preparation 7, 0.25 part of an alkyl aryl sulfonate (Nacconol NR) and 0.25 part of Daxad No. 27 and 200 parts of water. A portion of this concentrate was diluted with water to form aqueous spray compositions containing .06, .25 and .50 pound of the compound per 100 gallons of ultimate composition.

The latter spray compositions were sprayed with an atomizing spray nozzle using air pressure at 20 pounds per square inch on young tomato plants 3 to 5 inches high. The applications were carried out so as to give thorough coverage of all surfaces of the leaves of the plants without appreciable run off. Following the application, the spray composition was allowed to dry upon the leaf surfaces and the plants then inoculated by spraying with an aqueous suspension of viable spores of *Alternaria solani*, the causal organism of tomato early blight. Untreated tomato plants were similarly inoculated and all plants were placed in a moist chamber and maintained at 70° F. under saturated humidity conditions for 24 hours. Thereafter, the plants, placed in a shaded greenhouse for 48 hours, were observed for lesions caused by the blight organisms. The dosages at which the acid was employed together with the results of the observation expressed as percent control of *Alternaria solani* are set forth in the following table.

| Concentration of Acid in Pounds per 100 Gallons of Spray Composition | Percent Control of Alternaria Solani |
|---|---|
| .06 | 97 |
| .25 | 100 |
| .50 | 100 |

At the time of the observations, the check plants were found to be heavily covered with lesions attributable to *Alternaria solani*.

EXAMPLES 3–8

Water dispersible liquid concentrates were prepared by mixing and grinding together in a ballmill .25 part by weight of one of the active ingredients, 0.25 part of Daxad No. 27, 0.25 part of Nacconol NR and 200 parts of water. A portion of each of these concentrates was dispersed in water to prepare aqueous spray compositions containing various concentrations of the dithiocarbamic acid compound per 100 gallons of ultimate mixture. These compositions were employed as described in Example 2 for the control of tomato early blight on tomato plants. The results obtained in these operations are set forth in the following table.

| Dithiocarbamic Acid, Active Ingredient | Concentration in Pounds per 100 gallons of Spray Mixture | Percent Kill of Alternaria solani |
|---|---|---|
| 2-Methyl-2 (1-Pyrrolidinyl)propyl | .50 | 100 |
|  | .25 | 100 |
|  | .06 | 97 |
|  | .03 | 99 |
| 2-(1-Pyrrolidinyl)propyl | .06 | 99 |
| 3-(3-Ethyl-5-Methyl piperidino)propyl | .12 | 100 |
|  | .06 | 91 |
| 2-Piperidinoethyl | .25 | 100 |
| 1-Methyl-2 (1-Pyrrolidinyl)-ethyl | .25 | 80 |
| 1-Methyl-3-(1-Pyrrolidinyl)-propyl | .25 | 99 |

At the time of observation, check plants infested in the same manner were found to be heavily covered with lesions attributable to *Alternaria solani*.

This application is a continuation-in-part of my co-pending application, Serial No. 682,607, filed September 9, 1957, for "Dithiocarbamic Acids," now abandoned.

We claim:
1. A method which comprises applying to fungal organisms and their habitats a fungicidal amount of a compound having the formula

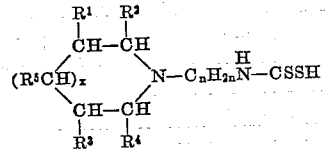

wherein, $n$ represents an integer from 2 to 4, inclusive; $R^1$ and $R^2$ each represent a member selected from the group consisting of hydrogen, lower alkyl and ethylene radicals joined together to form with the carbon atoms of attachment of the heterocyclic ring a six-membered saturated ring; $R^3$, $R^4$ and $R^5$ each represent a member selected from the group consisting of hydrogen and lower alkyl; and, $x$ represents an integer from 0 to 1, inclusive.

2. A method claimed in claim 1 wherein said dithiocarbamic acid compounds are employed in the form of a composition comprising said compounds in intimate admixture with parasiticide adjuvant as a carrier thereof.

3. A method claimed in claim 1 wherein said dithiocarbamic acid is 2-methyl-3 (1-pyrrolidinyl)propyldithiocarbamic acid.

4. A method claimed in claim 1 wherein said dithiocarbamic acid is 3-(1-pyrrolidinyl)propyldithiocarbamic acid.

5. A method claimed in claim 1 wherein said dithiocarbamic acid is 3-(2-ethyl-5-methylpiperidino)propyldithiocarbamic acid.

6. A method claimed in claim 1 wherein said dithiocarbamic acid is (2-piperidinoethyl)dithiocarbamic acid.

7. A method claimed in claim 1 wherein said dithiocarbamic acid is methyl-2 (1-pyrrolidinyl)ethyldithiocarbamic acid.

8. A method claimed in claim 1 wherein said dithiocarbamic acid is 1-methyl-3-(1-pyrrolidinyl)propyldithiocarbamic acid.

References Cited in the file of this patent
UNITED STATES PATENTS

| 2,218,739 | Bruson | Oct. 22, 1940 |
| 2,505,870 | Snyder et al. | May 2, 1950 |
| 2,561,208 | Kirk | July 17, 1951 |
| 2,706,194 | Morris et al. | Apr. 12, 1955 |
| 2,744,898 | Harman et al. | May 8, 1956 |
| 2,844,580 | Ashby et al. | July 22, 1958 |

OTHER REFERENCES

Chem. Abst. Decennial Index (A–C), 1937–46, p. 4665.